United States Patent
Alkov et al.

(10) Patent No.: US 9,517,418 B2
(45) Date of Patent: Dec. 13, 2016

(54) CONVERSATION DETECTION IN A VIRTUAL WORLD

(75) Inventors: Christopher S. Alkov, Austin, TX (US); Travis M. Grigsby, Austin, TX (US); Ruthie D. Lyle, Durham, NC (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 2633 days.

(21) Appl. No.: 12/180,885

(22) Filed: Jul. 28, 2008

(65) Prior Publication Data
US 2010/0023877 A1    Jan. 28, 2010

(51) Int. Cl.
*A63F 13/87* (2014.01)
*A63F 13/35* (2014.01)
*A63F 13/30* (2014.01)
*G06N 3/00* (2006.01)

(52) U.S. Cl.
CPC .......... *A63F 13/87* (2014.09); *A63F 13/12* (2013.01); *A63F 13/35* (2014.09); *G06N 3/006* (2013.01); *A63F 2300/5533* (2013.01); *A63F 2300/63* (2013.01); *A63F 2300/64* (2013.01)

(58) Field of Classification Search
USPC ........................................................ 715/757
See application file for complete search history.

(56) References Cited

U.S. PATENT DOCUMENTS 6,772,195 B1 * 8/2004 Hatlelid .............. G06F 3/04815 345/419
2007/0005701 A1 * 1/2007 Barsness et al. ............. 709/205

OTHER PUBLICATIONS

Sarah Robbins et al., "Second Life for Dummies," Jan. 2008.*

* cited by examiner

*Primary Examiner* — Maryam Ipakchi
(74) *Attorney, Agent, or Firm* — Steven M. Greenberg, Esq.; CRGO Law

(57) ABSTRACT

Embodiments of the present invention address deficiencies of the art in respect to virtual world management and provide a method, data processing system and computer program product for conversation detection in a virtual world. In an embodiment of the invention, a method for conversation management in a virtual world data processing system can include detecting a sequence of statements from at least two avatars in a virtual world, and locating the avatars in the virtual world, computing a temporal proximity of the statements. The statements can be grouped in the virtual world if the avatars are geographically proximate to one another in the virtual world and if the statements have occurred within a threshold temporal proximity of one another. Thereafter, the grouped statements can be persisted in the virtual world as a conversation.

19 Claims, 1 Drawing Sheet

CONVERSATION DETECTION IN A VIRTUAL WORLD

BACKGROUND OF THE INVENTION

Field of the Invention

The present invention relates to virtual reality and more particularly to virtual world management over a computer communications network.

Description of the Related Art

As the progenitor to the modern virtual world, the multi-user dungeon provided a revolutionary experience for its first participants more than three decades ago. The multi-user dungeon was and continues to be a multi-player computer game that combines elements of role-playing, first person shooter and social chat. The multi-user dungeon generally executes in a central server configured for simultaneous access by participants over a global computer communications network like the Internet. The multi-user dungeon historically has been text-driven where the immediate environment is presented to participants in text form, and participants engage in actions in the environment through textual directives mimicking the postings of an instant messenger. Non-player characters in the multi-user dungeon can be automated and the actions of the non-player characters can be broadcast to the participants also as textual postings.

Like a multi-user dungeon, virtual reality allows a user to interact with a computer-simulated environment; however in virtual reality, the virtual environment is visual in nature and can be displayed either on a computer screen or through customized or stereoscopic displays. Advanced modes of virtual reality further incorporate other sensory presentation elements, including audio elements and tactile elements. Generally, end-users interact with a virtual reality environment through traditional keyboard and mouse movements, though other input means are provided occasionally including gyroscopic handheld devices and gloves, and joysticks. Consistent throughout all virtual reality experiences, the virtual reality environment reflects the real world environment and has proven invaluable in commercial applications such as flight simulation or combat training.

The virtual world builds upon the multi-user dungeon and virtual reality in order to provide a computer-based simulated environment in which participants interact with one another through three-dimensional visually displayable surrogates referred to as avatars. In this regard, participants "inhabit" the virtual world through their respective avatars. In as much as avatars can freely roam the bounds of the virtual world, virtual worlds expand the boundaries of the multi-user dungeon and permit participants to truly enjoy freedom of motion and exploration within the virtual world. To date, virtual worlds have become such close approximations to reality that the lines of reality have become blurred to the extent that many participants treat ordinary interactions in the virtual world with the same degree of seriousness as those same interactions in the real world.

Conversations between avatars in a virtual world are analogous to postings in a discussion forum. In a discussion forum, an end user can selectively locate a class of discussion relevant to a proposed posting and the end user can post the posting to the selected class of discussion. Providing the same degree of organization in the virtual world, however, is much more challenging. While a conversation between avatars provides a natural organizational unit for organizing postings, determining when a conversation has occurred between avatars is difficult. In particular, in many cases, two avatars speaking in proximity to one another just as easily can be interpreted as avatars speaking to others.

BRIEF SUMMARY OF THE INVENTION

Embodiments of the present invention address deficiencies of the art in respect to virtual world management and provide a novel and non-obvious method, system and computer program product for conversation detection in a virtual world. In an embodiment of the invention, a method for conversation management in a virtual world data processing system can include detecting a sequence of statements from at least two avatars in a virtual world, and locating the avatars in the virtual world, computing a temporal proximity of the statements. The statements can be grouped in the virtual world if the avatars are geographically proximate to one another in the virtual world and if the statements have occurred within a threshold temporal proximity of one another. Thereafter, the grouped statements can be persisted in the virtual world as a conversation.

Optionally, grouping the statements in the virtual world if the avatars are geographically proximate to one another in the virtual world and if the statements have occurred within a threshold temporal proximity of one another also can be limited to the occasion when a most recent one of the statements had been posted within a threshold period of elapsed time. Alternatively, the grouping of the statements can be limited to the occasion when the avatars are moving in a similar direction. As another alternative, the grouping of the statements can be limited to the occasion when the avatars are facing each other. As yet another alternative, the grouping of the statements can be limited to the occasion when the avatars are participating in a same activity in the virtual world. As even yet another alternative, the grouping of the statements can be limited to the occasion when no physical barriers separate the avatars. Other limitations can include limiting the grouping of the statements to the occasion when the avatars are labeled friends in the virtual world when neither of the avatars is in a private chat with a different avatar.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for conversation detection in a virtual world. In accordance with an embodiment of the present invention, the statements of different avatars in a virtual world can be monitored. In particular, the temporal proximity of each monitored statement, the frequency of temporally proximate monitored statements, and the geographic proximity of avatars uttering the statements can be computed. Monitored statements computed to have a temporal proximity within a threshold value from avatars in geographic proximity to one another can be determined to form a conversation between the avatars. As such, the monitored statements can be organized in the virtual world as a conversation between the avatars.

Figure 1:
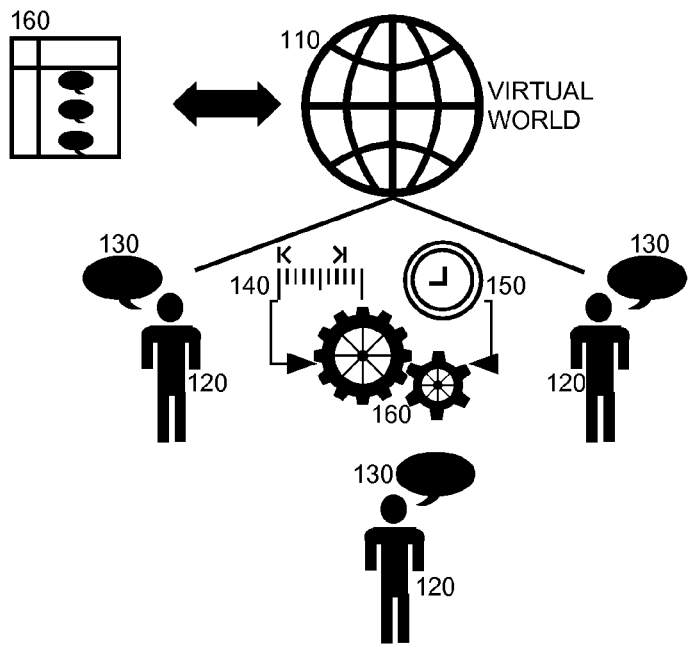
FIG. 1 is a pictorial illustration of a process for conversation detection in a virtual world.

In illustration, FIG. 1 pictorial depicts a process for conversation detection in a virtual world. As shown in FIG. 1, multiple different avatars 120 in different locations in a virtual world 110 can post statements 130 at different times. Conversation determination logic 160 can monitor the statements 130 to compute both geographic and temporal metrics 140, 150 for the statements 130. In this regard, the geographic proximity of the different avatars 120 can be computed as part of the geographic metrics 140, and the frequency of the statements 130 from individual ones of the avatars 120 along with the temporal interval between different statements 130 of the avatars 120 in geographic proximity to one another can be computed. Optionally, the content of the statements 130 can be parsed and analyzed to determine whether or not the statements 130 are related thus constituting a conversation—for example, by identifying the use of identical or similar words in the statements 130.

Notably, the conversation determination logic 160 can determine that a conversation subsists between different ones of the avatars 120 according to the computed geographic and temporal metrics 140, 150. For instance, individual statements 130 posted by two of the avatars 120 in close geographic proximity to one another within a threshold period of time can be determined to be a conversation. Further, the conversation can be determined to be ongoing if a given one of the statements 130 posted by the two avatars 120 has occurred in a recent span of time. Once conversation determination logic 160 has determined that a conversation subsists between two or more of the avatars 120, the statements 130 determined to be part of the conversation can be written to an organizational data structure 160 in memory according to the conversation, its participants and the timing of the conversation.

Figure 2:
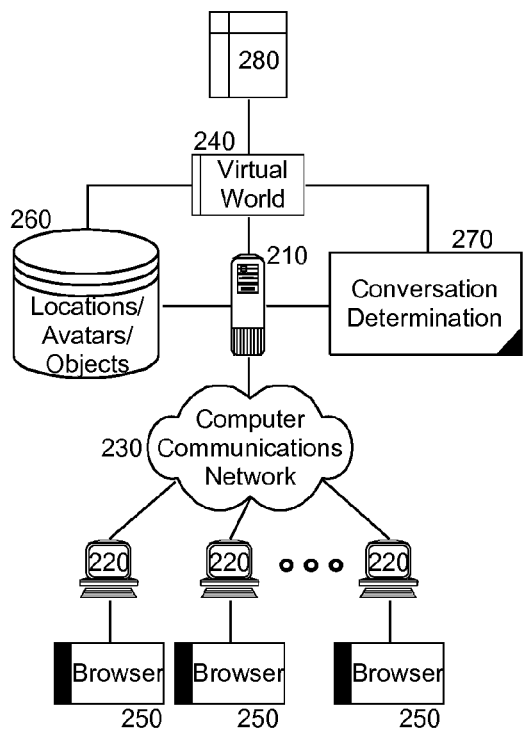
FIG. 2 is a schematic illustration of a virtual world management data processing system configured for conversation detection in a virtual world; and, FIG. 3 is a flow chart illustrating a process for conversation detection in a virtual world.

The process described in FIG. 1 can be implemented within a virtual world management data processing system. In illustration, FIG. 2 schematically shows a virtual world management data processing system configured for conversation detection in a virtual world. The system can include a virtual world host server 210 configured for communicative coupling to different browsers 250 disposed in respectively different clients 220 over computer communications network 230. The virtual world host server 210 further can support the creation and management of a virtual world 240 coupled to a data store of locations, avatars and objects 260 managed within the virtual world 240. In this regard, virtual world participants can interact with the avatars and objects in different locations of the virtual world 240 through respective browsers 250 as permitted by the program code of the virtual world host server 210 managing the virtual world 240.

In accordance with an embodiment of the inventive arrangements, conversation determination logic 270 can be provided in connection with the virtual world host server 210, either as part of the virtual world host server 210, as a programmatic extension to the virtual world host server 210, or as a separate but cooperate programmatic module communicatively coupled to the virtual world host server 210. In any case, the conversation determination logic 270 can include program code enabled to measure temporal metrics for different statements by different avatars in the virtual world 240 and the geographic proximity of the avatars posting statements in temporal proximity to one another.

Specifically, the program code of the conversation determination logic 270 can be enabled to determine the subsistence of a conversation between avatars in the virtual world 240 when the statements of the avatars within geographic proximity to one another occur within a threshold period of time between one another with a threshold degree of frequency. Yet further, the program code of the conversation determination logic 270 can be enabled to group the statements according to determined conversation in persistent memory 280. The grouping of the statements, however, can be limited to a number of circumstances, including:

When the avatars are traveling generally in the same direction

When the avatars are facing each other

When the avatars are participating in a common activity such as a game

When the avatars have no physical barrier like a wall between them

When the avatars are associated with one another in the virtual world, such as is the case with friends When neither of the avatars is busy or engaged in a private chat with another avatar In this way, the statements of the avatars in the virtual world can be autonomically managed through the determination of the presence of different conversations between different avatars in the virtual world 240.

Figure 3:
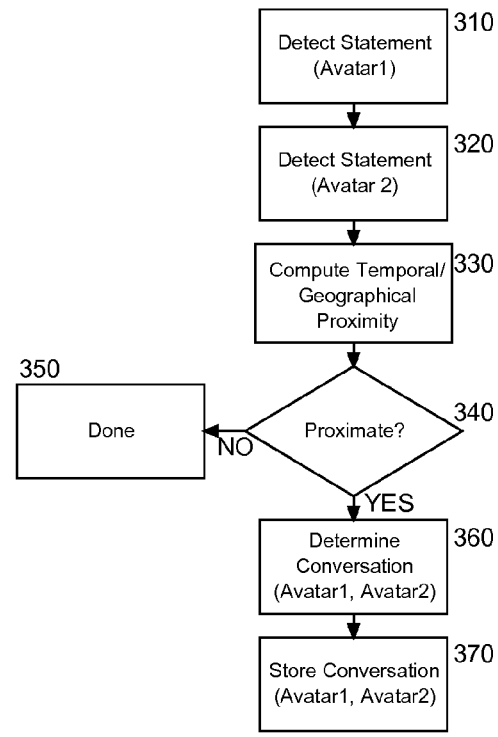

In even yet further illustration of the operation of the conversation determination logic 270, FIG. 3 is a flow chart illustrating a process for conversation detection in a virtual world as simplified to the statements of two avatars in a location in a virtual world. Beginning in block 310, a statement can be detected for a first avatar. In block 320, a statement also can be detected for a second avatar. In block 330, both geographic and temporal metrics can be computed for the first and second avatars. In particular, the geographic proximity of the first and second avatars can be determined as can the lapse of time between the statements of the first and second avatars—namely the temporal proximity of the statements.

In decision block 340, it can be determined whether or not the first and second avatars are geographically proximate to one another, and further whether or not the statements of the first and second avatars are temporally proximate to one another. If not, the process can end in block 350. However, if it is determined that the first and second avatars are geographically proximate to one another, and further that the statements of the first and second avatars are temporally proximate to one another, in block 360 a conversation can be determined to subsist between the first and second avatars including the statements of each. Accordingly, in block 370 the statements of the avatars can be stored as a conversation in the virtual world.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for conversation management in a virtual world data processing system, the method comprising:
    recording a sequence of statements from different avatars in a virtual world;
    locating a position of each of the avatars in the virtual world;
    computing a temporal proximity of each of the recorded statements to others of the recorded statements;
    grouping selected ones of the recorded statements in the virtual world if corresponding ones of the avatars are geographically proximate to one another in the virtual world and if the selected ones of the statements have occurred within a threshold temporal proximity of one another; and,
    persisting the grouped statements in the virtual world as a conversation.

2. The method of claim 1, wherein grouping the statements in the virtual world if the avatars are geographically proximate to one another in the virtual world and if the statements have occurred within a threshold temporal proximity of one another, comprises, grouping the statements in the virtual world if the avatars are geographically proximate to one another in the virtual world and if the statements have occurred within a threshold temporal proximity of one another and if a most recent one of the statements had been posted within a threshold period of elapsed time.

3. The method of claim 1, wherein grouping the statements in the virtual world if the avatars are geographically proximate to one another in the virtual world and if the statements have occurred within a threshold temporal proximity of one another, comprises, grouping the statements in the virtual world if the avatars are geographically proximate to one another in the virtual world and if the statements have occurred within a threshold temporal proximity of one another and if the avatars are moving in a similar direction.

4. The method of claim 1, wherein grouping the statements in the virtual world if the avatars are geographically proximate to one another in the virtual world and if the statements have occurred within a threshold temporal proximity of one another, comprises, grouping the statements in the virtual world if the avatars are geographically proximate to one another in the virtual world and if the statements have occurred within a threshold temporal proximity of one another and if the avatars are facing each other.

5. The method of claim 1, wherein grouping the statements in the virtual world if the avatars are geographically proximate to one another in the virtual world and if the statements have occurred within a threshold temporal proximity of one another, comprises, grouping the statements in the virtual world if the avatars are geographically proximate to one another in the virtual world and if the statements have occurred within a threshold temporal proximity of one another and if the avatars are participating in a same activity in the virtual world.

6. The method of claim 1, wherein grouping the statements in the virtual world if the avatars are geographically proximate to one another in the virtual world and if the statements have occurred within a threshold temporal proximity of one another, comprises, grouping the statements in the virtual world if the avatars are geographically proximate to one another in the virtual world and if the statements have occurred within a threshold temporal proximity of one another and if no physical barriers separate the avatars.

7. The method of claim 1, wherein grouping the statements in the virtual world if the avatars are geographically proximate to one another in the virtual world and if the statements have occurred within a threshold temporal proximity of one another, comprises, grouping the statements in the virtual world if the avatars are geographically proximate to one another in the virtual world and if the statements have occurred within a threshold temporal proximity of one another and if the avatars are labeled friends in the virtual world.

8. The method of claim 1, wherein grouping the statements in the virtual world if the avatars are geographically proximate to one another in the virtual world and if the statements have occurred within a threshold temporal proximity of one another, comprises, grouping the statements in the virtual world if the avatars are geographically proximate to one another in the virtual world and if the statements have occurred within a threshold temporal proximity of one another and neither of the avatars is in a private chat with a different avatar.

9. The method of claim 1, wherein grouping the statements in the virtual world if the avatars are geographically proximate to one another in the virtual world and if the statements have occurred within a threshold temporal proximity of one another, further comprises, grouping the statements in the virtual world if the statements contain content indicating that the statements are related as part of a conversation.

10. A virtual world management data processing system configured for conversation detection in a virtual world, the system comprising:
   a virtual world host server supporting a virtual world executing in the host server and providing access to different end users over a computer communications network, the host server having a processor and a memory;
   a plurality of avatars disposed in different locations in the virtual world and
   managed by the virtual world host server; and,
   conversation determination logic coupled to the host server, the logic comprising program code enabled to record a sequence of statements from different avatars, to locate a position of each of the avatars in the virtual world, to compute a temporal proximity of each of the recorded statements to others of the recorded statements, group selected ones of the recorded statements in the virtual world if corresponding ones of the avatars are geographically proximate to one another in the virtual world and if the statements have occurred within a threshold temporal proximity of one another, and to persist the grouped statements in the virtual world as a conversation.

11. A non-transitory computer program product comprising a computer usable storage medium storing computer usable program code for conversation management in a virtual world data processing system, the computer program product comprising:
   computer usable program code for recording a sequence of statements from different avatars in a virtual world;
   computer usable program code for locating a position of each of the avatars in the virtual world;
   computer usable program code for computing a temporal proximity of each of the recorded statements to others of the recorded statements;
   computer usable program code for grouping selected ones of the recorded statements in the virtual world if corresponding ones of the avatars are geographically proximate to one another in the virtual world and if the selected ones of the statements have occurred within a threshold temporal proximity of one another; and,
   persisting the grouped statements in the virtual world as a conversation.

12. The computer program product of claim 11, wherein the computer usable program code for grouping the statements in the virtual world if the avatars are geographically proximate to one another in the virtual world and if the statements have occurred within a threshold temporal proximity of one another,
   comprises, computer usable program code for grouping the statements in the virtual world if the avatars are geographically proximate to one another in the virtual world and if the statements have occurred within a threshold temporal proximity of one another and if a most recent one of the statements had been posted within a threshold period of elapsed time.

13. The computer program product of claim 11, wherein the computer usable program code for grouping the statements in the virtual world if the avatars are geographically proximate to one another in the virtual world and if the statements have occurred within a threshold temporal proximity of one another,
   comprises, computer usable program code for grouping the statements in the virtual world if the avatars are geographically proximate to one another in the virtual world and if the statements have occurred within a threshold temporal proximity of one another and if the avatars are moving in a similar direction.

14. The computer program product of claim 11, wherein the computer usable program code for grouping the statements in the virtual world if the avatars are geographically proximate to one another in the virtual world and if the statements have occurred within a threshold temporal proximity of one another,
   comprises, computer usable program code for grouping the statements in the virtual world if the avatars are geographically proximate to one another in the virtual world and if the statements have occurred within a threshold temporal proximity of one another and if the avatars are facing each other.

15. The computer program product of claim 11, wherein the computer usable program code for grouping the statements in the virtual world if the avatars are geographically proximate to one another in the virtual world and if the statements have occurred within a threshold temporal proximity of one another,
   comprises, computer usable program code for grouping the statements in the virtual world if the avatars are geographically proximate to one another in the virtual world and if the statements have occurred within a threshold temporal proximity of one another and if the avatars are participating in a same activity in the virtual world.

16. The computer program product of claim 11, wherein the computer usable program code for grouping the statements in the virtual world if the avatars are geographically proximate to one another in the virtual world and if the statements have occurred within a threshold temporal proximity of one another,
   comprises, computer usable program code for grouping the statements in the virtual world if the avatars are geographically proximate to one another in the virtual world and if the statements have occurred within a threshold temporal proximity of one another and if no physical barriers separate the avatars.

17. The computer program product of claim 11, wherein the computer usable program code for grouping the statements in the virtual world if the avatars are geographically proximate to one another in the virtual world and if the statements have occurred within a threshold temporal proximity of one another,
   comprises, computer usable program code for grouping the statements in the virtual world if the avatars are geographically proximate to one another in the virtual world and if the statements have occurred within a threshold temporal proximity of one another and if the avatars are labeled friends in the virtual world.

18. The computer program product of claim 11, wherein the computer usable program code for grouping the statements in the virtual world if the avatars are geographically proximate to one another in the virtual world and if the statements have occurred within a threshold temporal proximity of one another,
   comprises, computer usable program code for grouping the statements in the virtual world if the avatars are geographically proximate to one another in the virtual world and if the statements have occurred within a threshold temporal proximity of one another and neither of the avatars is in a private chat with a different avatar.

19. The computer program product of claim 11, wherein the computer usable program code for grouping the statements in the virtual world if the avatars are geographically proximate to one another in the virtual world and if the statements have occurred within a threshold temporal proximity of one another, further comprises, computer usable program code for grouping the statements in the virtual world if the statements contain content indicating that the statements are related as part of a conversation.

\* \* \* \* \*